(12) United States Patent
Kim et al.

(10) Patent No.: US 9,937,482 B2
(45) Date of Patent: Apr. 10, 2018

(54) SUPER ABSORBENT POLYMER RESIN AND METHOD FOR PREPARING SAME

(71) Applicant: LG Chem, Ltd., Seoul (KR)

(72) Inventors: Gi Cheul Kim, Daejeon (KR); Sung Soo Park, Daejeon (KR)

(73) Assignee: LG Chem, Ltd. (KR)

( * ) Notice: Subject to any disclaimer, the term of this patent is extended or adjusted under 35 U.S.C. 154(b) by 3 days.

(21) Appl. No.: 15/035,968

(22) PCT Filed: Dec. 10, 2014

(86) PCT No.: PCT/KR2014/012126
§ 371 (c)(1),
(2) Date: May 11, 2016

(87) PCT Pub. No.: WO2015/088242
PCT Pub. Date: Jun. 18, 2015

(65) Prior Publication Data
US 2016/0367965 A1    Dec. 22, 2016

(30) Foreign Application Priority Data

Dec. 11, 2013 (KR) .................. 10-2013-0153585
Dec. 10, 2014 (KR) .................. 10-2014-0177337

(51) Int. Cl.
*B01J 20/26* (2006.01)
*C08F 2/10* (2006.01)
(Continued)

(52) U.S. Cl.
CPC .......... *B01J 20/267* (2013.01); *B01J 20/261* (2013.01); *B01J 20/28004* (2013.01); *B01J 20/28016* (2013.01); *B01J 20/3021* (2013.01); *B01J 20/3085* (2013.01); *C08F 2/10* (2013.01); *C08F 2/48* (2013.01); *C08F 220/06* (2013.01);
(Continued)

(58) Field of Classification Search
CPC ... C08F 220/66; C08F 2/48; C08F 2/10; C08J 3/24
See application file for complete search history.

(56) References Cited

U.S. PATENT DOCUMENTS 5,669,894 A    9/1997    Goldman et al.
6,228,930 B1    5/2001    Dairoku et al.
(Continued)

FOREIGN PATENT DOCUMENTS

CN    1254354 A    5/2000
CN    1122067 C    9/2003
(Continued)

OTHER PUBLICATIONS

International Search Report from PCT/KR2014/012126, dated Mar. 13, 2015.
(Continued)

*Primary Examiner* — Sanza Mcclendon
(74) *Attorney, Agent, or Firm* — Lerner, David, Littenberg, Krumholz & Mentlik, LLP (57) ABSTRACT

Disclosed herein are a superabsorbent polymer resin comprising agglomerated particles with a size of 450 μm or less, and a method for preparing the same. The superabsorbent polymer resin exhibits significant improvement in absorption rate and permeability.

20 Claims, 2 Drawing Sheets

(51) Int. Cl.

| | |
|---|---|
| *C08J 3/075* | (2006.01) |
| *C08J 3/24* | (2006.01) |
| *C08F 2/48* | (2006.01) |
| *B01J 20/28* | (2006.01) |
| *B01J 20/30* | (2006.01) |
| *C08J 3/12* | (2006.01) |
| *C08F 220/06* | (2006.01) |

(52) U.S. Cl.
CPC ............... *C08J 3/075* (2013.01); *C08J 3/12* (2013.01); *C08J 3/24* (2013.01); *C08J 3/245* (2013.01); *C08J 2333/02* (2013.01)

(56) References Cited

U.S. PATENT DOCUMENTS

| | | | |
|---|---|---|---|
| 6,323,252 B1 | 11/2001 | Gartner et al. | |
| 7,402,643 B2* | 7/2008 | Torii | A61L 15/60 |
| | | | 525/329.5 |
| 7,750,085 B2* | 7/2010 | Torii | C08J 3/245 |
| | | | 428/407 |
| 8,182,916 B2* | 5/2012 | Kimura | A61L 15/60 |
| | | | 428/403 |
| 9,090,718 B2* | 7/2015 | Sakamoto | C08F 2/44 |
| 2003/0008946 A1* | 1/2003 | Dairoku | A61L 15/60 |
| | | | 523/201 |
| 2007/0066167 A1 | 3/2007 | Wada et al. | |
| 2007/0207924 A1 | 9/2007 | Ikeuchi et al. | |
| 2009/0023848 A1 | 1/2009 | Ahmed et al. | |
| 2011/0003685 A1 | 1/2011 | Ziemer et al. | |
| 2011/0245436 A1 | 10/2011 | Gartner et al. | |
| 2012/0083411 A1 | 4/2012 | Ahmed et al. | |
| 2012/0220745 A1 | 8/2012 | Machida et al. | |
| 2014/0051813 A1 | 2/2014 | Won et al. | |
| 2014/0054497 A1 | 2/2014 | Wattebled et al. | |
| 2014/0058048 A1 | 2/2014 | Won et al. | |
| 2015/0087742 A1* | 3/2015 | Won | B01J 20/3208 |
| | | | 522/181 |
| 2015/0210843 A1* | 7/2015 | Kimura | A61L 15/60 |
| | | | 525/187 |

FOREIGN PATENT DOCUMENTS

| | | |
|---|---|---|
| CN | 1747751 A | 3/2006 |
| CN | 1856331 A | 11/2006 |
| CN | 101177462 A | 5/2008 |
| CN | 101802029 A | 8/2010 |
| EP | 0885917 A2 | 12/1998 |
| EP | 1690887 A1 | 8/2006 |
| JP | H11140194 A | 5/1999 |
| JP | H11279288 A | 10/1999 |
| JP | 2008533213 A | 8/2008 |
| KR | 20070007162 A | 1/2007 |
| KR | 20070012623 A | 1/2007 |
| KR | 2012-0054836 A | 5/2012 |
| KR | 20120059169 A | 6/2012 |
| KR | 20130086125 A | 7/2013 |
| KR | 20130120400 A | 11/2013 |
| TW | 200526276 A | 8/2005 |
| TW | 200911849 A | 3/2009 |
| WO | 2004069915 A2 | 8/2004 |
| WO | 2004099265 A1 | 11/2004 |
| WO | 2005027986 A1 | 3/2005 |
| WO | 2005092955 A1 | 10/2005 |
| WO | 2006101271 A1 | 9/2006 |
| WO | 2011034147 A1 | 3/2011 |
| WO | 2012143235 A1 | 10/2012 |

OTHER PUBLICATIONS

Third Party Observation from PCT/KR2014/012126, dated Apr. 11, 2016.

* cited by examiner

SUPER ABSORBENT POLYMER RESIN AND METHOD FOR PREPARING SAME

CROSS-REFERENCE TO RELATED APPLICATION

The present application is a national phase entry under 35 U.S.C. § 371 of International Application No. PCT/KR2014/012126, filed Dec. 10, 2014, which claims priority from Korean Application Nos. 10-2014-0177337, filed Dec. 10, 2014, and 10-2013-0153585, filed Dec. 11, 2013, all of which are incorporated herein by reference.

TECHNICAL FIELD

The present invention relates to a superabsorbent polymer resin and a method for the preparation thereof. More particularly, the present invention relates to a superabsorbent polymer resin with improved absorption rate and permeability, and a method for preparing the same.

BACKGROUND

Superabsorbent polymers (SAPs) are synthetic polymer materials having a capacity for absorbing 500 to 1000 times their own weight in moisture. Although developed for practical use in sanitary items such as disposable diapers for children, SAPs now find additional applications in a variety of fields including raw materials in soil conditioners for horticulture, water stopping agents for civil engineering and construction applications, sheets for raising seedlings, freshness preservatives for food distribution, goods for fomentation, and the like.

The absorption mechanism of SAPs is governed by interactions of various factors including the osmotic pressure attributed to a difference in the electric attraction shown by a charge of a polymer electrolyte, the affinity between water and the polymer electrolyte, the molecular expansion attributed to repulsive force between ions of polymer electrolyte, and the expansion restraint due to cross-link bonds. In other words, the absorbency of SAPs depends on the affinity and molecular expansion while the absorption rates are greatly influenced by the osmotic pressure of the water absorbent polymer itself.

Extensive research has been directed towards an improvement in the absorption rate of SAPs. For example, Korean Patent Application Unexamined Publication No. 2007-0012623 A discloses a particulate water absorbing agent in which contents of resin particulates are determined according to the size thereof. However, the absorbing agent still needs an improvement in both absorption rate and water permeability.

SUMMARY OF THE INVENTION

Accordingly, the present invention has been made keeping in mind the above problems occurring in the prior art, and an object of the present invention is to provide a superabsorbent polymer resin in which agglormerated fines are contained in an amount of 15% by weight or greater, with a decrease in the content of particles having a size of 600~850 μm and 150~300 μm and an increase only in the content of particles having a size of 300~600 μm, therefore improving in both absorption rate and permeability.

In order to accomplish the above object, the present invention provides a method for preparing a superabsorbent polymer resin, comprising the steps of: a) preparing a hydrogel phase polymer by thermal- or photo-polymerizing a composition comprising a water-soluble ethylene-based unsaturated monomer and a polymerization initiator; b) drying the hydrogel phase polymer; c) milling the dried polymer; d) classifying the milled hydrogel phase polymer by particle size into particles with sizes of less than 150 μm, from 150 μm to less than 300 μm, from 300 μm to less than 450 μm, from 450 μm to less than 600 μm, and from 600 μm to 850 μm; e) blending normal particles ranging in size from 600 μm to 850 μm, from 300 μm to less than 600 μm, and from 150 μm to less than 300 μm with agglomerated particles with a size of 450 μm or less; f) adding a surface crosslinking agent to the mixed hydrogel phase polymers; and g) performing a surface cross-linking reaction on the hydrogel phase polymers, said the particle blend of step e) containing particles with a size of 600~850 μm in an amount of 0.01~3 wt %, particles with a size of 300~600 μm in an amount of 50~80 wt %, and particles with a size of 150~300 μm in an amount of 1~25 wt %, and the agglomerated particles with a size of 450 μm or less in an amount of 15~30 wt %, based on the total weight of the normal particles and the agglomerated particles.

Also, the present invention provides a superabsorbent polymer resin, comprising milled hydrogel phase polymer polymerized from water-soluble ethylene-based unsaturated monomers, wherein the milled hydrogel phase polymer is comprised of a blend of normal particles ranging in size from 600 μm to 850 μm, from 300 μm to less than 600 μm, and from 150 μm to less than 300 μm with agglomerated particles with a size of 450 μm or less, both the normal particles and the agglomerated particles being surface cross-linked, the particle blend containing particles with a size of 600~850 μm in an amount of 0.01~3 wt %, particles with a size of 300~600 μm in an amount of 50~80 wt %, and particles with a size of 150~300 μm in an amount of 1~25 wt %, and the agglomerated particles with a size of 450 μm or less in an amount of 15~30 wt %, based on the total weight of the normal particles and the agglomerated particles.

Advantageous Effects

Compared to conventional superabsorbent polymer resins, the superabsorbent polymer resins according to the present invention are greatly improved in both absorption rate and permeability.

DETAILED DESCRIPTION OF THE EMBODIMENTS

Below, a detailed description will be given of the present invention.

The present invention provides a method for preparing a superabsorbent polymer resin, comprising the steps of: a) preparing a hydrogel phase polymer by thermal- or photo-polymerizing a composition comprising a water-soluble ethylene-based unsaturated monomer and a polymerization initiator; b) drying the hydrogel phase polymer; c) milling the dried polymer; d) classifying the milled hydrogel phase polymer by particle size into particles with sizes of less than 150 μm, from 150 μm to less than 300 μm, from 300 μm to less than 450 μm, from 450 μm to less than 600 μm, and from 600 μm to 850 μm; e) blending normal particles ranging in size from 600 μm to 850 μm, from 300 μm to less than 600 μm, and from 150 μm to less than 300 μm with agglomerated particles s with a size of 450 μm or less; f) adding a surface crosslinking agent to the mixed hydrogel phase polymers; and g) performing a surface cross-linking reaction on the hydrogel phase polymers, said particle blend of step e) containing particles with a size of 600~850 μm in an amount of 0.01~3 wt %, particles with a size of 300~600 μm in an amount of 50~80 wt %, and particles with a size of 150~300 μm in an amount of 1~25 wt %, and the agglomerated particles with a size of 450 μm or less in an amount of 15~30 wt %, based on the total weight of the normal particles and the agglomerated particles.

The method for the preparation of a superabsorbent polymer resin in accordance with the present invention starts with thermal polymerization or photopolymerization of water-soluble, ethylene-based unsaturated monomers to a hydrogel phase polymer in the presence of a polymerization initiator.

For this, steps or processes typical in the art may be employed. In detail, the polymerization initiator contained in the monomer composition for use in the preparation of the superabsorbent polymer resin of the present invention may depend on the type of polymerization. That is, either a photopolymerization initiator or a thermal polymerization initiator may be used. For photopolymerization, however, heat is generated not only by UV light irradiation, but also as the polymerization, which is an exothermic reaction, proceeds. Hence, a thermal polymerization initiator may be additionally contained even upon photopolymerization.

Although no special limitations are imparted thereto, the photopolymerization initiator useful in the method for the preparation of the superabsorbent polymer resin according to the present invention may be preferably selected from the group consisting of a sodium persulfate salt, an azo compound, hydrogen peroxide, and ascorbic acid. Examples of the sodium persulfate initiator include sodium persulfate ($Na_2S_2O_8$), potassium persulfate ($K_2S_2O_8$), and ammonium persulfate (($NH_4$)$_2S_2O_8$). Among the azo compound useful as a thermal polymerization initiator in the preparation of the superabsorbent polymer resin according to the present invention are 2, 2-azobis(2-amidinopropane) dihydrochloride, 2,2-azobis-(N, N -dimethylene)isobutyramidine dihydrochloride, 2-(carbamoylazo)isobutylonitrile), 2,2-azobis [2-(2-imidazolin-2-yl)propane] dihydrochloride, and 4,4-azobis-(4-cyanovaleric acid).

The photopolymerization initiator available in the method for the preparation of the superabsorbent polymer resin according to the present invention, although specifically limited, may be preferably selected from the group consisting of benzoin ether, dialkyl acetophenone, hydroxyl alkylketone, phenyl glyoxylate, benzyl dimethyl ketal, acyl phosphine, α-aminoketone, and a combination thereof. As an acyl phosphine, commercially available lucirin TPO, that is, 2, 4, 6-trimethyl-benzoyl-trimethyl phosphine oxide may be used.

So long as it is typically used in the preparation of superabsorbent polymer resins, any water-soluble, ethylene-based unsaturated monomer may be used without limitations in the preparation method of superabsorbent polymer resins according to the present invention. Preferably, the water-soluble, ethylene-based unsaturated monomer may be selected from the group consisting of an anionic monomer or a salt thereof, a non-ionic hydrophilic monomer, an amino group-containing unsaturated monomer and a quaternary salt thereof, and a combination thereof. Examples of the water-soluble, ethylene-based unsaturated monomer include anionic monomers or salts thereof, such as those of acrylic acid, methacrylic acid, anhydrous maleic acid, fumaric acid, crotonic acid, itaconic acid, 2-acryloylethanesulfonic acid, 2-methacryloylethanesulfonic acid, 2-(meth)acryloylpropanesulfonic acid, and 2-(meth)acrylamide-2-methylpropane sulfonic acid; non-ionic hydrophilic monomers, such as (meth)acrylamide, N-substituted (meth)acrylate, 2-hydroxyethyl (meth)acrylate, 2-hydroxypropyl (meth)acrylate, methoxypolyethyleneglycol (meth)acrylate, and polyethylene glycol (meth)acrylate; and an amino group containing unsaturated monomers or quaternary salts thereof, such as (N, N)-dimethylaminoethyl (meth)acrylate, and (N, N)-dimethylaminopropyl (meth)acrylamide, with preference for an acrylic acid or a salt thereof. Advantageously from acrylic acid or a salt thereof, a superabsorbent polymer resin that is particularly improved in absorbency can be obtained.

In the method for preparing a superabsorbent polymer resin according to the present invention, micro- or submicro-particles of the prepared superabsorbent polymer resin, that is, the prepared superabsorbent polymer resins that are 150 μm or less in particle size may be employed in a certain amount. In detail, the polymer or resin powder with a particle size of 150 μm or less may be added to the monomer composition before the polymerization reaction or to the reaction mixture at an initial, middle or late phase of the polymerization. No limitations are imparted to the amount of the superabsorbent polymer resin powder. Preferably, it is added in an amount of 1 to 10 parts by weight, based on 100 parts by weight of the monomer of the monomer composition, in terms of preventing physical properties of the final superabsorbent polymer resin product.

In the method for preparing a superabsorbent polymer resin in accordance with the present invention, the content of the water-soluble ethylene-based unsaturated monomer in the monomer composition may be properly determined in consideration of polymerization time and reaction conditions, and may preferably range from 40 to 55% by weight. Less than 40% by weight of the water-soluble ethylene-based unsaturated monomer is economically disadvantageous. When the monomer is used in an amount exceeding 55% by weight, the resulting hydrogel phase polymer may be milled at a low rate.

So long as it is typically used for thermal polymerization or photopolymerization in the art, any technique may be applied without configurational limitations to the preparation of a hydrogel phase polymer from the monomer composition. Largely, polymerization is divided into thermal polymerization and photopolymerization according to energy source. On the whole, thermal polymerization may be performed in a reactor installed with a stirring shaft, such as a kneader. For photopolymerization, a conveyer belt may run under a light source in a reactor. These techniques are illustrated as exemplary embodiments, but are not construed to limit the present invention.

For example, a hydrogel phase polymer is prepared in a reactor installed with a stirring shaft, such as a kneader, by thermal polymerization, e.g., by providing hot air to the reactor or by heating the reactor, and discharged from the reactor as particles millimeters to centimeters long according to the type of the stirring shaft. In detail, the size of the obtained hydrogel phase polymer particles may vary depending on the concentration and feeding rate of the monomer composition, and typically ranges from 2 to 50 mm.

In addition, when photopolymerization is performed on a movable conveyer belt as mentioned above, the resulting hydrogel phase polymer may typically take a sheet-like form with a width as large as that of the belt. The polymer sheet may vary in thickness depending on the concentration and feeding rate of the monomer composition. The monomer composition is preferably fed such that a sheet-like polymer with a thickness of 0.5 to 5 cm may be obtained. A feeding condition of the monomer composition that affords too thin a polymer sheet may result in low productivity. When the thickness of the sheet-like polymer exceeds 5 cm, the polymerization reaction may not occur evenly over the full thickness.

The light source available in the photopolymerization step is not imparted with special limitations. Any UV light that causes a photopolymerization reaction may be employed. For example, light with a wavelength of 200 to 400 nm, or UV radiation such as that from a Xe lamp, a mercury lamp, or a metal halide lamp may be used. The photopolymerization may be performed for approximately 5 sec to approximately 10 min under a light intensity of approximately 0.1 mw/cm$^2$ to approximately 1 kw/cm$^2$. When the light intensity is too low or the irradiation time is too short, insufficient polymerization reactions may result. On the other hand, too high a light intensity or too long an irradiation time may cause a poor quality of the superabsorbent resins.

Next, b) drying the hydrogel phase polymer is carried out in the method for preparing a superabsorbent polymer resin in accordance with the present invention.

The hydrogel phase polymer obtained in step a) has a water content of 30 to 60% by weight. As used herein, the term "water content" refers to weight percentage of water to the total weight of the hydrogel phase polymer. The amount of water may be obtained by subtracting the weight of dried polymer from the total weight of the hydrogel phase polymer (in detail, after the polymer is dried by infrared heating, the mass loss attributed to moisture evaporation is measured. The drying condition is such that the atmosphere is heated from room temperature to 180° C. and maintained at 180° C., with a total drying time set to be 20 min including 5 min for the temperature increment).

The hydrogel phase polymer obtained in step a) undergoes a drying process. Preferably, the drying may be conducted at 150° C. to 250° C. The term "drying temperature", as used herein, means the temperature of a heat medium provided for drying or the temperature of a drier including a heat medium and the polymer therein.

A drying temperature of less than 150° C. may make the drying time long, and is apt to degrade properties of the final superabsorbent polymer resin. When the drying temperature exceeds 250° C., there is high likelihood that only the surface of the polymer is dried, which leads to the generation of fine powder in a subsequent pulverization step, and the degradation of properties of the final superabsorbent polymer resin. Preferably, the drying may be conducted at 150° C. to 250° C., and more particularly at 160° C. to 200° C.

As for the drying time, it is not specifically limited, and may be set to range 20 to 90 min in consideration of process efficiency.

Any drying process that is typically used to dry hydrogel phase polymers may be selected, without limitations to the configuration thereof. In detail, the drying step may be conducted by supplying hot air, or irradiating with IR light, microwaves, or UV light. After the drying step, the water content of the polymer may be decreased to 0.1 to 10% by weight.

In advance of the drying step, as needed, the method for preparing a superabsorbent polymer resin in accordance with the present invention may further comprise briefly crushing the hydrogel phase polymer to enhance the efficiency of the drying step. In this brief crushing step, the hydrogel phase polymer may be crushed into particles with a size of 1 mm to 15 mm. It is technically difficult to crush the polymer into particles less than 1 mm in size due to the high water content of the hydrogel phase polymer. Even though possible to crush the polymer into particles less than 1 mm in size, the crushed particles are prone to agglomeration therebetween. On the other hand, crushed particles with a size of 15 mm do not guarantee the subsequent drying step will be efficient.

For use in the brief crushing step prior to the drying step, a crushing machine may be employed without limitations to the configuration thereof. Examples of the crushing machine include, but are not limited to, a vertical pulverizer, a turbo cutter, a turbo grinder, a rotary cutter mill, a cutter mill, a disc mill, a shred crusher, a crusher, a chopper, and a disc cutter.

When a crushing step is carried out to enhance the drying efficiency in the subsequent drying step, the hydrogel phase polymer may be likely to adhere to the surface of the crusher. To increase the efficiency of the pre-drying crushing step, an additive preventive of the adherence of the hydrogel phase polymer to the crusher may be employed. Examples of the additive available for preventing the adherence include a powder aggregation preventer such as steam, water, a surfactant, or inorganic powder, e.g., clay or silica; a thermal polymerization initiator, such as a persulfate initiator, an azo-type initiator, hydrogen peroxide, and ascorbic acid; a crosslinking agent, such as an epoxy-based crosslinking agent, a diol-containing crosslinking agent, a crosslinking agent containing acrylate of multifunctionality, e.g., bi- or tri-functionality, and a mono-functional compound containing a hydroxide group, but are not limited thereto.

After the drying step, the method for preparing a superabsorbent polymer resin according to the present invention proceeds to c) milling the dried polymer. The polymer particles obtained in the milling step have a particle size of 150 to 850 μm. The milling step of the method for preparing a superabsorbent polymer resin according to the present invention may be achieved with a mill the examples of which include, but are not limited to, a pin mill, a hammer mill, a screw mill, a roll mill, a disc mill and a jog mill.

A subsequent step in the method for preparing a superabsorbent polymer resin in accordance with the present invention is d) classifying the milled hydrogel phase polymer by particle size into particles with sizes of less than 150 μm, from 150 μm to less than 300 μm, from 300 μm to less than 450 μm, from 450 μm to less than 600 μm, and from 600 μm to 850 μm. As the classification criterion, the particle size refers to a specific surface area per weight of the polymer particle. The larger the particle sizes of classification are, the more the distribution of the surface cross-linking agent is evenly distributed over the polymer particles. In consideration of the homogeneous distribution of the added surface crosslinking agent and the process economy, the particles are classified into sizes of less than 150 μm, from 150 μm to less than 300 μm, from 300 μm to less than 450 μm, from 450 μm to less than 600 μm, and from 600 μm to 850 μm in the method for preparing a superabsorbent polymer resin according to the present invention.

In this classification step, the hydrogel phase polymer from a polymer feeder is milled to particles with 150 to 850 μm using a mill, followed by classification by size in a classifier. In this regard, particles with a size less than 150 μm are not further classified whereas particles larger than 850 μm in size may be returned back to the mill.

Afterwards, the method for preparing a superabsorbent polymer resin in accordance with the present invention goes with e) blending normal particles ranging in size from 600 μm to 850 μm, from 300 μm to less than 600 μm, and from 150 μm to less than 300 μm with agglomerated particles with a size of 450 μm or less. In step e), the term "normal particles" means hydrogel phase polymer particles with a size of 600~850 μm, 300~600 μm, and 150~300 μm in mixture, and the term "agglomerated particles" means an aggregation reassembled from hydrogel phase polymer particles 450 μm or less in size. The agglomerated particles may be obtained by mixing particles less than 450 μm in size with water at a weight part ratio of 100:50 to 300 for 30 sec to 5 min in a mixer rotating at a high speed.

Preferably, the hydrogel phase polymer of step e) may contain particles with a size of 600~850 μm in an amount of 0.01~3% by weight, particles with a size of 300~600 μm in an amount of 50~80% by weight, and particles with a size of 150~300 μm in an amount of 1~25% by weight, and the agglomerated particles with a size of 450 μm or less in an amount of 15~30% by weight, based on the total weight of the normal particles and the agglomerated particles.

In addition, the hydrogel phase polymer of step e) may contain particles with a size of 600~850 μm in an amount of 0.1~2% by weight, particles with a size of 300~600 μm in an amount of 55~80% by weight, and particles with a size of 150~300 μm in an amount of 3~25% by weight, and the agglomerated particles with a size of 450 μm or less in an amount of 15~30% by weight, based on the total weight of the normal particles and the agglomerated particles.

In addition, the agglomerated particles may be obtained by reassembling particles with a size of 400 μm or less.

When containing the agglomerated particles in an amount of 15% by weight while decreasing in the content of particles with a size of 600~850 μm and 150~300 μm and increasing in the content of particles with a size of 300~600 μm, the superabsorbent polymer resin of the present invention can exhibit an improvement in both absorption rate and permeability.

Next, the method for preparing a superabsorbent polymer resin in accordance with the present invention goes with f) adding respective surface crosslinking agents to the blended hydrogel phase polymers. In this step, a surface crosslinking agent is added to the hydrogel phase polymer in which the normal particles and the agglomerated particles are blended. The respective surface crosslinking agents added to the hydrogel phase polymers of different particle sizes may be identical or different in composition.

Any surface crosslinking agent that reacts with a functional group of the polymer can be employed without limitations to the configuration thereof in the method for preparing a superabsorbent polymer resin according to the present invention. Preferably to enhance properties of the superabsorbent polymer resin thus prepared, the surface crosslinking agent may be selected from the group consisting of a polyhydric compound; an epoxy compound; a polyamine compound; a haloepoxy compound; a haloepoxy compound condensate; an oxazoline compound; a mono-, di- or polyoxazolidinone compound; a cyclic urea compound; a multi-valent metal salt; an alkylene carbonate compound; and a combination thereof.

Concrete examples of the polyhydric alcohol compound include mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol.

The epoxy compound may be ethylene glycol diglycidyl ether or glycidol. The polyamine compound may be selected from the group consisting of ethylene diamine, diethylene triamine, triethylene tetraamine, tetraethylene pentamine, pentaethylene hexamine, polyethylene imine, polyamide polyamine, and a combination thereof.

Epichlorohydrin, epibromohydrin, and α-methylepichlorohydrin may fall within the scope of the haloepoxy compound useful as a surface crosslinking agent. The mono-, di- or polyoxazolidinone compound may be exemplified by 2-oxazolidinone. Ethylene carbonate may be representative of the alkylene carbonate compound. These compounds may be used alone or in combination. In order to enhance the efficiency of the surface crosslinking process, the surface crosslinking agent preferably includes at least one polyhydric alcohol compound, and more preferably a polyhydric alcohol compound of 2 to 10 carbon atoms.

The amount of the surface crosslinking agent added to the surface of the polymer particles may be determined according to the type of the surface crosslinking agent or the reaction condition, but may typically range from 0.001 to 5 parts by weight, based on 100 parts by weight of the polymer, preferably from 0.01 to 3 parts by weight, and more preferably from 0.05 to 2 parts by weight.

If too little the surface crosslinking agent is used, the surface crosslinking reaction may not occur. On the other hand, the presence of the surface crosslinking agent in an amount exceeding 5 parts by weight based on 100 parts by weight of the polymer induces an excessive surface crosslinking reaction, which degrades the physical properties of the superabsorbent polymer resin.

No limitations are imposed on the modality of adding the surface crosslinking agent to the polymer. For example, the surface crosslinking agent may be mixed with the polymer powder in a reactor, sprayed on the polymer powder, or fed, together with the polymer, to a reactor such as a mixer.

Finally, the method for preparing a superabsorbent polymer resin in accordance with the present invention is completed with g) performing a surface cross-linking reaction on the hydrogel phase polymers, To achieve elevation to a reaction temperature within 1 to 60 min after the addition of the surface crosslinking agent, the polymer itself may preferably have a temperature of 20° C. to 80° C. upon the addition of the surface crosslinking agent. To maintain the temperature in the polymer itself, a process subsequent to the drying step, which proceeds at a relatively high temperature, may be run within a short period of time, without delay. When the subsequent process is difficult to complete within a short period of time, the polymer may be separately heated.

Also, to complete the temperature elevation to a reaction temperature within 1 to 60 min after the addition of the surface crosslinking agent, the surface crosslinking agent itself added to the polymer may be heated.

When a surface crosslinking reaction is conducted after a temperature elevation for the surface crosslinking reaction is achieved within 1 to 60 min, the surface crosslinking process may be run efficiently. Thus, the superabsorbent polymer resin thus prepared can exhibit excellent physical properties, with a minimum residual monomer content therein. The temperature of the surface crosslinking agent may be preferably adjusted to a range of 5° C. to 60° C., and more preferably 10° C. to 40° C. When the temperature of the surface crosslinking agent is below 5° C., the effect of the elevated temperature of the crosslinking agent on the reduced time of elevation to a surface crosslinking reaction temperature is offset. On the other hand, the surface crosslinking agent heated above 60° C. may be evenly dispersed over the polymer particles. As used herein, the term "surface crosslinking reaction temperature" is defined as an overall temperature of the surface crosslinking agent and the polymer used in the surface crosslinking reaction.

Without limitations, a temperature elevating means for the surface crosslinking reaction may be employed. By way of example, a heat medium may be provided, or the reaction mixture may be directly heated with electricity. As a heat source, steam, electricity, UV light, or IR radiation may be used, or heated thermal liquid may be employed.

In the method for preparing a superabsorbent polymer resin according to the present invention, the crosslinking reaction after the completion of temperature elevation may be run for 1 to 60 min, preferably for 5 min to 40 min, and most preferably for 10 min to 20 min. A reaction time shorter than 1 min does not guarantee a sufficient crosslinking reaction. When a crosslinking reaction time exceeds 60 min, the surface crosslinking reaction proceeds excessively, resulting in degradation of the physical properties of the superabsorbent polymer resin, and a breakdown of the polymer due to the long retention in the reactor.

The present invention addresses a superabsorbent polymer resin prepared using the method described above.

The superabsorbent polymer resin of the present invention comprises a milled hydrogel phase polymer polymerized from water-soluble ethylene-based unsaturated monomers, wherein the milled hydrogel phase polymer is comprised of a blend of normal particles ranging in size from 600 μm to 850 μm, from 300 μm to less than 600 μm, and from 150 μm to less than 300 μm with agglomerated particles with a size of 450 μm or less, both the normal particles and the agglomerated particles being surface crosslinked, the particle blend containing particles with a size of 600~850 μm in an amount of 0.01~3 wt %, particles with a size of 300~600 μm in an amount of 50~80 wt %, and particles with a size of 150~300 μm in an amount of 1~25 wt %, and the agglomerated particles with a size of 450 μm or less in an amount of 15~30 wt %, based on the total weight of the normal particles and the agglomerated particles.

In one exemplary embodiment, the particle blend may contain particles with a size of 600~850 μm in an amount of 0.1~2 wt %, particles with a size of 300~600 μm in an amount of 55~80 wt %, and particles with a size of 150~300 μm in an amount of 3~25 wt %, and a agglomerated particles with a size of 450 μm or less in an amount of 15~30 wt %, based on the total weight of the normal particles and the agglomerated particles.

In another exemplary embodiment, the agglomerated particles may be prepared using particles with a size of 400 μm or less.

The superabsorbent polymer resin prepared using the method of the present invention is found to have an absorption time of 40 sec or less, as measured by a vortex test, and an SFC (saline flow conductivity) of $50 \times 10^{-7}$ $cm^3 \cdot s/g$ or greater.

A better understanding of the present invention may be obtained through the following examples that are set forth to illustrate, but are not to be construed as limiting the present invention. While specific embodiments of and examples for the invention are described above for illustrative purposes, various equivalent modifications are possible within the scope of the invention, as those skilled in the relevant art will recognize. In addition, unless stated otherwise, the terms "%" and "part" or "part," as used in the context of amount, are on the basis of mass.

EXAMPLES

Preparation of Hydrogel Phase Polymer

A monomer composition was obtained by adding 0.01 g of diphenyl(2,4,6-trimethylbenzoyl)-phosphine oxide as a photoinitiator, 0.18 g of sodium persulfate as a thermal initiator, and 0.30 g of polyethylene glycol diacrylate as a crosslinking agent to a mixture of 100 g of acrylic acid, 0.033 g of, 38.9 g of caustic soda (NaOH), and 103.9 g of water. The monomer composition was maintained at 40° C. using a thermostat. Then, the warmed monomer composition was fed onto a rotary, two-axis silicon belt, and irradiated with UV at an intensity of 10 mW for 60 sec. In order to facilitate thermal polymerization subsequent to the photopolymerization, the reactor maintained the internal temperature at 90° C. and was equipped with a hot air blower and an adiabatic means.

Afterwards, hydrogel phase polymer discharged from a cutter was dried at 180° C. for 1 hr in a hot air drier.

Next, the hydrogel phase polymer was milled using a pin mill, and classified into particles with sizes of less than 150 μm, from 150 μm to less than 300 μm, from 300 μm to less than 450 μm, from 450 μm to less than 600 μm, and from 600 μm to 850 μm, using sieves.

Agglomerated particles were obtained by mixing 100 parts by weight of particles less than 450 μm in size per 100 parts by weight of water for 1 min in a high-speed mixer. The agglomerated particles had a water content of approximately 50% in which particles adhered to one another due to high interparticular adherence.

After milled in a pin mill, the agglomerated particles were dried at 180° C. for 1 hr, and sieved to select particles with a size of 150 μm to 600 μm.

The agglomerated particles thus obtained were mixed with the classified, normal particles (150 μm to less than 850 μm), as shown in Table 1, to give pre-surface crosslinking particles, that is, particles to be ready for surface crosslinking.

TABLE 1

| | Normal Particle | | | agglomerated particles |
|---|---|---|---|---|
| | 850~600 μm | 600~300 μm | 300~150 μm | Content | Content |
| Ex. 1 | 1 | 60 | 24 | 85% | 15% |
| Ex. 2 | 1 | 60 | 16 | 77% | 23% |
| Ex. 3 | 1 | 60 | 9 | 70% | 30% |
| C. Ex. 1 | 35 | 50 | 15 | 100% | 0% |
| C. Ex. 2 | 1 | 67 | 32 | 100% | 0% |
| C. Ex. 3 | 1 | 60 | 29 | 90% | 10% |

Preparation of Superabsorbent Polymer Resin

The pre-surface crosslinking particles prepared in Examples 1 to 3 and Comparative Examples 1 to 3 were surface crosslinked to afford superabsorbent resins. For this, 1.0 part by weight of 1,3-propandiol and 3.0 parts by weight of water were sprayed per 100 parts by weight of the pre-surface crosslinking particles, followed by performing a surface crosslinking reaction at 180° C. for 30 min in a surface crosslinking reactor. Then, a cooling step was further carried out to give superabsorbent resin powder.

TEST EXAMPLES

Assay for Physical Properties

To evaluate physical properties of the superabsorbent polymer resins of Examples 1 to 3 and Comparative Examples 1 to 3, the following tests were conducted.

(1) Centrifugal Retention Capacity (CRC)

W grams (about 0.1 g) of each of the superabsorbent polymer resins prepared in Examples 1 to 3 and Comparative Examples 1 to 3 was placed into a non-woven bag that was then sealed, and immersed into 0.9 mass % saline. After 30 min of immersion, centrifugation was carried out at 250×g for 3 min for dewatering. The dewatered bag alone weighed W2 (g). The same procedure was repeated, with the exception that no resins were employed. In this regard, the dewatered bag alone weighed W1 (g). CRC (g/g) was calculated from the weight measurements according to the following equation.

$$CRC(g/g) = \{(W2(g) - W1(g))/W(g)\} - 1 \quad \text{[Math Equation 1]}$$

(2) Absorbency Under Pressure (AUP)

A stainless-steel 400 mesh net was welded onto the bottom of a plastic supporting cylinder having an internal diameter of 60 mm. Then, 0.90 g of each of the superabsorbent polymer resins prepared in Examples 1 to 3 and Comparative Examples 1 to 3 was evenly sprayed onto that metal net on the bottom. A piston was placed so as to evenly impart a load of 4.83 kPa (0.7 psi) to the sprayed resin. The piston had an external diameter slightly less than 60 mm such that it smoothly moved vertically within the cylinder, with no spaces left between the external wall of the piston and the internal wall of the cylinder. The resulting cylinder weighed Wa (g).

A 5-mm thick glass filter with a diameter of 90 mm was placed in a 150-mm petri dish. A physiological saline containing 0.90 wt % of sodium chloride was added until it was flush with the top side of the glass filter. A sheet of filter paper with a diameter of 90 mm was placed on the saline. Then, a measuring device set was placed on the wet filter paper so that the paper could absorb the solution under the load. An hour later, the measuring device set was lifted, and the resulting cylinder weighed Wb (g).

Absorbency under pressure was calculated from the measurements according to the following equation:

$$AUP(g/g) = [Wb(g) - Wa(g)]/Wt. \text{ of absorbent resin} \quad \text{[Math Equation 2]}$$

(3) Saline Flow Conductivity (SFC)

The superabsorbent polymer resins prepared in Examples 1 to 3 and Comparative Examples 1 to 3 were measured for permeability to an aqueous 0.69 wt % NaCl solution under a load of 2.07 kPa according to the SFC test protocol disclosed in U.S. Pat. No. 5,669,894.

(4) Vortex-Test

In a 100 ml beaker, 50 ml of a 0.9 wt % NaCl solution was stirred at 600 rpm using a stirrer while 2.00 g of each of the superabsorbent polymer resins prepared in Examples 1 to 3 and Comparative Examples 1 to 3 was added to the solution. The time needed for the solution to have a smooth surface as a result of the disappearance of the vortex of liquid caused by stirring was measured.

Figure 1:
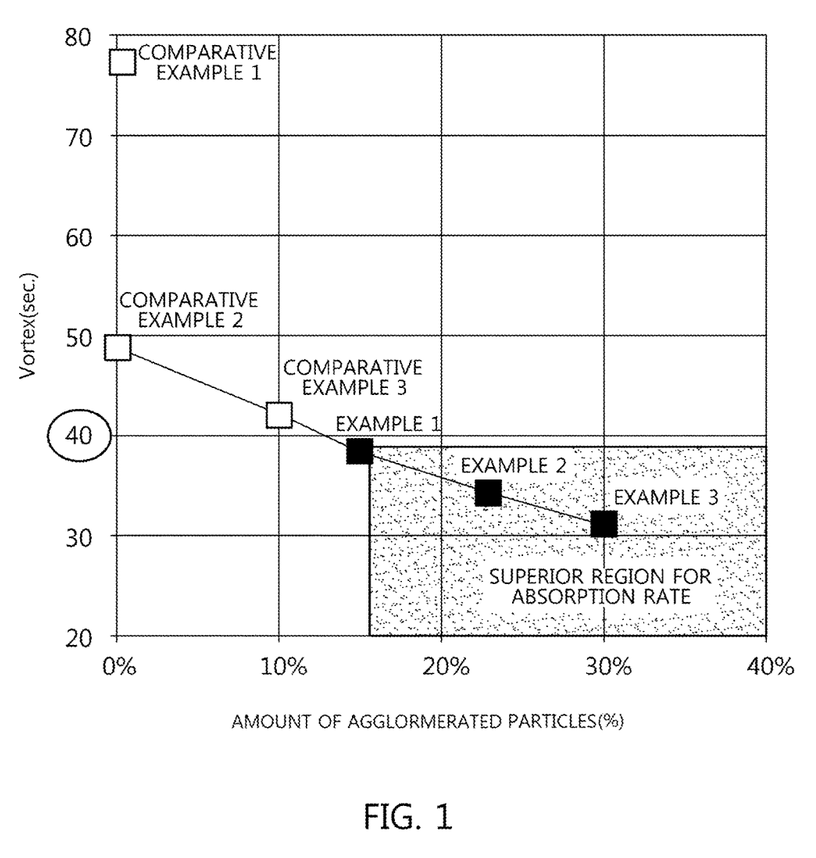
FIG. 1 is a graph showing permeability of superabsorbent polymer resins prepared in Examples and Comparative Examples.
Figure 2:
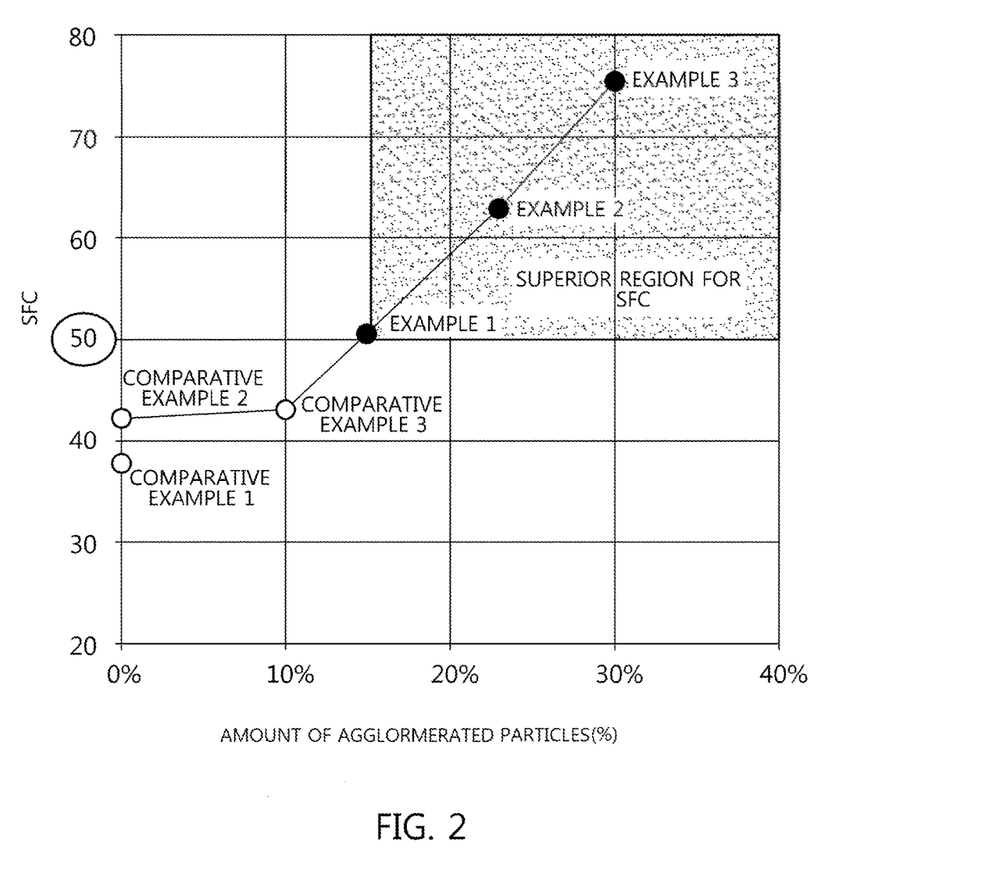
FIG. 2 is a graph showing absorption rates of superabsorbent polymer resins prepared in Examples and Comparative Examples.

Physical properties measured above are summarized in Table 2, below. Data on the vortex test and the SFC assay are depicted in FIGS. 1 and 2, respectively.

TABLE 2

| | Physical Property | | | |
|---|---|---|---|---|
| | CRC | 0.7 AUP | SFC ($10^{-7}$ cm$^3$ · s/g) | Vortex (S) |
| Ex. 1 | 29.8 | 23.7 | 50.6 | 38.3 |
| Ex. 2 | 29.5 | 23.2 | 62.7 | 34.0 |
| Ex. 3 | 31.1 | 24.6 | 75.0 | 31.0 |
| C. Ex. 1 | 31.0 | 24.9 | 39.0 | 78.0 |
| C. Ex. 2 | 31.6 | 24.4 | 42.5 | 49.0 |
| C. Ex. 3 | 30.8 | 24.7 | 43.8 | 42.0 |

As shown in Table 2, the superabsorbent polymer resins of Examples 1 to 3 are almost equal in CRC and 0.7 AUP to those of Comparative Examples 1 to 3. Data of Table 2, and FIGS. 1 and 2 show that the superabsorbent polymer resins of Examples 1 to 3 are superior in absorption rate to those of Comparative Examples 1 to 3 because of their much shorter vortex times. Also, an improvement in SFC was found in the superabsorbent polymer resins of Examples 1 to 3. Therefore, the superabsorbent polymer resins of the present invention are significantly improved in permeability and absorption rate, compared to conventional superabsorbent polymer resins.

What is claimed is:

1. A method for preparing a superabsorbent polymer resin, comprising:
   a) preparing a hydrogel phase polymer by thermal- or photo-polymerizing a composition comprising a water-soluble ethylene-based unsaturated monomer and a polymerization initiator;
   b) drying the hydrogel phase polymer;
   c) milling the dried polymer;
   d) separating the milled hydrogel phase polymer by particle size into particles having size less than 150 μm, from 150 μm to less than 300 μm, from 300 μm to less than 450 μm, from 450 μm to less than 600 μm, and from 600 μm to 850 μm;
   e) agglomerating a portion of the particles having sizes of 450 μm or less, and blending the agglomerated particles with the particles having sizes of from 600 μm to 850 μm, from 300 μm to less than 450 μm, from 450 μm to less than 600 μm, and from 150 μm to less than 300 μm to obtain a particle blend comprising the particles with size ranging from 600 μm to 850 μm present in an amount ranging from 0.01 wt % to 3 wt %, the particles with size ranging from 300 μm to less than 600 μm present in an amount ranging from 50 wt % to 80 wt %, the particles with size ranging from 150 μm to less than 300 μm present in an amount ranging from 1 wt % to 25 wt %, and the agglomerated particles present in an amount ranging from 15 wt % to 30 wt %, based on the total weight of the particle blend;
   f) cross linking the surfaces of the particles in the particle blend in the presence of a surface crosslinking agent to obtain a superabsorbent polymer resin,
   wherein agglomerating a portion of the particles having sizes of 450 μm or less in step e) comprises:
   mixing the portion of the particles having sizes of 450 μm or less and water in a weight ratio of 100:50 to 100:300 for a time period ranging from 30 sec to 5 min in a mixer rotating at a high speed.

2. The method of claim 1, wherein step e) comprises: agglomerating a portion of the particles having size of 400 μm or less.

3. The method of claim 1, wherein the particle blend comprises the particles with size ranging from 600 μm to 850 μm present in an amount ranging from 0.01 wt % to 2 wt %, the particles with size ranging from 300 μm to less than 600 μm present in an amount ranging from 55 wt % to 80 wt %, the particles with size ranging from 150 μm to less than 300 μm present in an amount ranging from 3 wt % to 25 wt %, and the agglomerated particles present in an amount ranging from 15 wt % to 30 wt %, based on the total weight of the particle blend.

4. The method of claim 1, wherein the surface crosslinking of step f) is performed in one surface crosslinking reactor.

5. The method of claim 1, further comprising:
crushing the hydrogel phase polymer into particles with a size of 1 mm to 15 mm, prior to step b).

6. The method of claim 1, wherein the drying step b) is carried out at a temperature ranging from 150° C. to 250° C.

7. The method of claim 1, wherein the surface crosslinking agent is selected from the group consisting of a polyhydric compound; an epoxy compound; a polyamine compound; a haloepoxy compound; a haloepoxy compound condensate; an oxazoline compound; a mono-, di- or polyoxazolidinone compound; a cyclic urea compound; a multivalent metal salt; an alkylene carbonate compound; and a combination thereof.

8. The method of claim 1, wherein the surface crosslinking agent is present in an amount of 0.001 to 5 parts by weight, based on 100 parts by weight of the polymer blend.

9. The method of claim 1, wherein the polymer blend has a temperature of 60 to 90° C. upon addition of the surface crosslinking agent, prior to the crosslinking in step f).

10. The method of claim 1, wherein the surface crosslinking agent has a temperature of 5 to 40° C. upon addition to the polymer blend, prior to the crosslinking in step f).

11. The method of claim 1, wherein the surface crosslinking reaction in step f) is carried out for 10 to 120 min.

12. The method of claim 1, wherein the surface crosslinking reaction of step f) is carried out at an elevated temperature using a heat source selected from the group consisting of steam, electricity, UV light, IR radiation and a combination thereof.

13. The method of claim 1, wherein the superabsorbent polymer resin has an absorption time of 40 sec or less, as measured by a vortex test.

14. The method of claim 1, wherein the superabsorbent polymer resin has an SFC (saline flow conductivity) of $50 \times 10^{-7}$ cm$^3$·s/g or greater.

15. A superabsorbent polymer resin, comprising a hydrogel phase polymer polymerized from water-soluble ethylene-based unsaturated monomers, wherein the polymer is comprised of a blend of surface crosslinked particles, wherein the surface crosslinked particles comprise particles ranging in sizes from 600μm to 850 μm, from 300 μm to less than 600 μm, and from 150 μm to less than 300 μm, and agglomerated particles, the agglomerated particles agglomerated from particles having size of 450 μm or less obtained by mixing a portion of particles having sizes of 450 μm or less and water in a weight ratio of 100:50 to 100:300 for a time period ranging from 30 sec to 5 min in a mixer rotating at a high speed, the particle blend containing the particles with size ranging from 600 μm to 850 μm present in an amount ranging from 0.01 wt % to 3 wt %, the particles with size ranging from 300 μm to less than 600 μm present in an amount ranging from 50 wt % to 80 wt %, the particles with size ranging from 150 μm to less than 300 μm present in an amount ranging from 1wt % to 25 wt %, and the agglomerated particles present in an amount ranging from 15 wt % to 30wt %, based on the total weight of the particle blend.

16. The superabsorbent polymer resin of claim 15, wherein the agglomerated particles are agglomerated from particles having size of 400 μm or less.

17. The superabsorbent polymer resin of claim 15, wherein the particle blend comprises the particles with size ranging from 600 μm to 850 μm present in an amount ranging from 0.01 wt % to 2 wt %, the particles with size ranging from 300 μm to less than 600 μm present in an amount ranging from 55 wt % to 80 wt %, the particles with size ranging from 150 μm to less than 300 μm present in an amount ranging from 3 wt % to 25 wt %, and the agglomerated particles present in an amount ranging from 15 wt % to 30 wt %, based on the total weight of the particle blend.

18. The superabsorbent polymer resin of claim 15, wherein the superabsorbent polymer resin has an absorption time of 40 sec or less, as measured by a vortex test.

19. The superabsorbent polymer resin of claim 15, wherein the superabsorbent polymer resin has an SFC (saline flow conductivity) of $50 \times 10^{-7}$ cm$^3$·s/g or greater.

20. The superabsorbent polymer resin of 15, prepared using the method of claim 1.

* * * * *